United States Patent
Mcgahan (10) Patent No.: US 12,430,856 B2
(45) Date of Patent: Sep. 30, 2025

(54) COMPACT AUGMENTED REALITY VIEW EXPERIENCE

(71) Applicant: Lowe's Companies, Inc., Mooresville, NC (US)

(72) Inventor: Deane Mcgahan, Shoreline, WA (US)

(73) Assignee: Lowe's Companies, Inc., Mooresville, NC (US)

(*) Notice: Subject to any disclaimer, the term of this patent is extended or adjusted under 35 U.S.C. 154(b) by 126 days.

(21) Appl. No.: 18/082,952

(22) Filed: Dec. 16, 2022

(65) Prior Publication Data

US 2024/0203063 A1    Jun. 20, 2024

(51) Int. Cl.
*G06T 19/00* (2011.01)
*G06T 17/00* (2006.01)
*G06T 19/20* (2011.01)

(52) U.S. Cl.
CPC ............ *G06T 19/006* (2013.01); *G06T 17/00* (2013.01); *G06T 19/20* (2013.01); *G06T 2200/24* (2013.01); *G06T 2210/04* (2013.01); *G06T 2219/2004* (2013.01); *G06T 2219/2012* (2013.01); *G06T 2219/2024* (2013.01)

(58) Field of Classification Search
None
See application file for complete search history.

(56) References Cited

U.S. PATENT DOCUMENTS

| | | | |
|---|---|---|---|
| 7,699,226 B2 | 4/2010 | Smith et al. | |
| 7,885,865 B2 | 2/2011 | Benson et al. | |
| 7,957,998 B2 | 6/2011 | Riley et al. | |
| 8,429,004 B2 | 4/2013 | Hamilton et al. | |
| 8,878,846 B1* | 11/2014 | Francis, Jr. | ........... G06T 19/006 345/428 |
| 8,941,645 B2 | 1/2015 | Grimaud | |
| 9,229,540 B2 | 1/2016 | Mandella et al. | |

(Continued)

FOREIGN PATENT DOCUMENTS

WO    2014049301 A1    4/2014

OTHER PUBLICATIONS

US 10,229,542 B2, 03/2019, Kutliroff et al. (withdrawn)

(Continued)

*Primary Examiner* — David H Chu
(74) *Attorney, Agent, or Firm* — Kilpatrick Townsend & Stockton LLP (57) ABSTRACT

A system receives image data generated by a camera of a device during an augmented reality (AR) session showing at least an existing object in physical space. The existing object has a first dimension along an axis of a coordinate system. The system determines a multi-dimensional model corresponding to a type of the existing object and having a second dimension along the axis smaller than the first dimension and determines a user selection of properties associated with the type. The system configures the multi-dimensional model to include the properties and retain the second dimension. The system causes the device to present, during the AR session using the coordinate system, the multi-dimensional model in an overlay. The AR session shows (i) at least a portion of the existing object and (ii) the multi-dimensional model over a remaining portion of the existing object configured according to the properties and the second dimension.

20 Claims, 7 Drawing Sheets

(56) References Cited

U.S. PATENT DOCUMENTS

| | | | |
|---|---|---|---|
| 9,338,622 B2 | 5/2016 | Bjontegard | |
| 9,349,200 B2 | 5/2016 | Cardno | |
| 9,473,747 B2 | 10/2016 | Kobres et al. | |
| 9,547,838 B2 | 1/2017 | Larsen | |
| 9,761,053 B2 | 9/2017 | Dzhurinskiy et al. | |
| 9,836,888 B2 | 12/2017 | Skidmore | |
| 9,928,438 B2 | 3/2018 | Wu et al. | |
| 9,972,158 B2 | 5/2018 | Schtein et al. | |
| 10,019,803 B2 | 7/2018 | Venable et al. | |
| 10,031,974 B1 | 7/2018 | Abdullah et al. | |
| 10,078,826 B2 | 9/2018 | Morandi et al. | |
| 10,176,642 B2 | 1/2019 | Tran et al. | |
| 10,268,266 B2 | 4/2019 | Mathey-Owens et al. | |
| 10,289,990 B2 | 5/2019 | Rizzolo et al. | |
| 10,387,897 B2 | 8/2019 | Sakata et al. | |
| 10,410,303 B1 | 9/2019 | Catalano | |
| 10,438,165 B2 | 10/2019 | Findlay | |
| 10,521,645 B2 | 12/2019 | Adato et al. | |
| 10,565,548 B2 | 2/2020 | Skaff et al. | |
| 10,592,855 B2 | 3/2020 | Griffin et al. | |
| 10,645,275 B1* | 5/2020 | Chuah | H04N 23/64 |
| 10,671,856 B1 | 6/2020 | Ren et al. | |
| 10,679,181 B1 | 6/2020 | Prater et al. | |
| 10,698,603 B2 | 6/2020 | Giusti et al. | |
| 10,732,968 B2 | 8/2020 | Ding et al. | |
| 10,733,661 B1 | 8/2020 | Bergstrom et al. | |
| 10,740,804 B2 | 8/2020 | Spivack et al. | |
| 10,769,582 B2 | 9/2020 | Williams et al. | |
| 10,789,622 B2 | 9/2020 | Ayush et al. | |
| 10,796,487 B2 | 10/2020 | Crews et al. | |
| 10,839,551 B2 | 11/2020 | Fink et al. | |
| 10,839,557 B1 | 11/2020 | Arora et al. | |
| 10,885,493 B2 | 1/2021 | Hassan et al. | |
| 10,885,577 B2 | 1/2021 | Parker et al. | |
| 10,908,771 B2 | 2/2021 | Berquam et al. | |
| 10,909,375 B2 | 2/2021 | Jabara et al. | |
| 10,956,967 B2 | 3/2021 | Ayush et al. | |
| 10,984,601 B2 | 4/2021 | Moroze et al. | |
| 11,093,785 B1 | 8/2021 | Siddiquie et al. | |
| 11,113,888 B2 | 9/2021 | Laurent et al. | |
| 11,120,459 B2 | 9/2021 | Vaculin et al. | |
| 11,126,961 B2 | 9/2021 | Kulkarni Wadhonkar et al. | |
| 11,189,078 B2 | 11/2021 | Sturm et al. | |
| 11,205,075 B2 | 12/2021 | Josephson et al. | |
| 11,263,795 B1 | 3/2022 | Desai et al. | |
| 11,276,236 B1* | 3/2022 | Bhushan | G06F 3/0482 |
| 11,354,549 B2 | 6/2022 | Shaw et al. | |
| 11,363,240 B2 | 6/2022 | Valli | |
| 11,367,250 B2* | 6/2022 | Totty | G06T 7/74 |
| 11,373,320 B1 | 6/2022 | Le et al. | |
| 11,423,075 B2 | 8/2022 | Morate et al. | |
| 11,430,191 B2 | 8/2022 | Tan et al. | |
| 11,436,805 B2 | 9/2022 | Gustavsson et al. | |
| 11,468,500 B2 | 10/2022 | Roesbery et al. | |
| 11,481,746 B2 | 10/2022 | Wu et al. | |
| 11,488,104 B2 | 11/2022 | Soon-Shiong | |
| 11,514,765 B2 | 11/2022 | Blaser | |
| 11,544,668 B2 | 1/2023 | Bahirat et al. | |
| 11,562,314 B2 | 1/2023 | Morate et al. | |
| 11,568,356 B1 | 1/2023 | Rochon et al. | |
| 11,842,437 B2* | 12/2023 | Dibra | G06N 3/08 |
| 11,928,783 B2* | 3/2024 | Assouline | G06V 20/64 |
| 11,954,762 B2* | 4/2024 | Ivanov | G06V 20/20 |
| 2006/0149634 A1 | 7/2006 | Pelegrin et al. | |
| 2008/0071559 A1* | 3/2008 | Arrasvuori | G06F 3/011 |
| | | | 705/26.1 |
| 2008/0144934 A1 | 6/2008 | Raynaud | |
| 2009/0157478 A1 | 6/2009 | Yang et al. | |
| 2012/0120113 A1* | 5/2012 | Hueso | G06F 3/011 |
| | | | 345/672 |
| 2012/0206452 A1* | 8/2012 | Geisner | G06F 3/013 |
| | | | 345/419 |
| 2013/0103608 A1 | 4/2013 | Scipioni et al. | |
| 2013/0293530 A1* | 11/2013 | Perez | G06Q 30/0251 |
| | | | 345/418 |
| 2013/0317950 A1 | 11/2013 | Abraham et al. | |
| 2013/0335405 A1* | 12/2013 | Scavezze | A63F 13/61 |
| | | | 345/419 |
| 2014/0104316 A1* | 4/2014 | Sharma | G06F 3/011 |
| | | | 345/633 |
| 2014/0172553 A1 | 6/2014 | Goulart | |
| 2014/0180864 A1* | 6/2014 | Orlov | G06Q 30/0631 |
| | | | 705/26.7 |
| 2014/0225978 A1* | 8/2014 | Saban | G06T 7/0012 |
| | | | 348/14.07 |
| 2014/0333666 A1* | 11/2014 | Poulos | G06T 19/006 |
| | | | 345/633 |
| 2015/0073947 A1 | 3/2015 | Higgins et al. | |
| 2015/0208043 A1 | 7/2015 | Lee et al. | |
| 2015/0228123 A1 | 8/2015 | Yasutake | |
| 2017/0061702 A1* | 3/2017 | Christen | G02B 27/017 |
| 2017/0082952 A1 | 3/2017 | Srinivasan et al. | |
| 2017/0132841 A1* | 5/2017 | Morrison | G06V 20/20 |
| 2018/0350148 A1* | 12/2018 | George | G09B 19/003 |
| 2019/0250802 A1* | 8/2019 | Schenck | G06F 3/011 |
| 2019/0281473 A1 | 9/2019 | Liao et al. | |
| 2019/0295151 A1* | 9/2019 | Ghadar | G06F 16/9038 |
| 2019/0362556 A1* | 11/2019 | Ben-Dor | G06F 3/167 |
| 2020/0013206 A1* | 1/2020 | Seely | G06F 40/154 |
| 2020/0090409 A1 | 3/2020 | Fink et al. | |
| 2020/0320792 A1* | 10/2020 | Sadalgi | G06F 3/017 |
| 2021/0042988 A1* | 2/2021 | Molyneaux | G06T 15/40 |
| 2021/0065287 A1 | 3/2021 | Sights et al. | |
| 2021/0117071 A1 | 4/2021 | Gharpuray | |
| 2021/0125414 A1* | 4/2021 | Berkebile | G06F 3/017 |
| 2021/0150805 A1* | 5/2021 | Stekovic | G06T 3/10 |
| 2021/0192099 A1 | 6/2021 | Benromano et al. | |
| 2021/0248669 A1 | 8/2021 | Wade et al. | |
| 2022/0028108 A1 | 1/2022 | Haapoja et al. | |
| 2022/0075907 A1 | 3/2022 | Vellasques et al. | |
| 2022/0130126 A1* | 4/2022 | Delgado | G06T 7/521 |
| 2022/0189075 A1 | 6/2022 | Lynch et al. | |
| 2022/0230216 A1 | 7/2022 | Buibas et al. | |
| 2022/0245715 A1 | 8/2022 | McGuinness et al. | |
| 2022/0262077 A1 | 8/2022 | Kim et al. | |
| 2022/0338049 A1* | 10/2022 | Ross | G16H 20/40 |
| 2022/0375169 A1* | 11/2022 | Berger | H04L 51/046 |
| 2022/0414973 A1* | 12/2022 | Daly | G06T 15/40 |
| 2023/0015235 A1 | 1/2023 | Van Der Heijden et al. | |
| 2023/0128629 A1* | 4/2023 | Go | G06Q 30/0643 |
| | | | 345/419 |
| 2023/0162448 A1* | 5/2023 | Alamdar | A63F 13/5372 |
| | | | 463/31 |
| 2023/0177832 A1* | 6/2023 | Besecker | G06F 3/011 |
| | | | 345/633 |
| 2023/0214900 A1* | 7/2023 | Assouline | G06Q 30/0643 |
| | | | 705/26.7 |
| 2023/0215081 A1* | 7/2023 | Hedberg | H04N 13/117 |
| 2023/0394817 A1* | 12/2023 | Besecker | G06Q 30/0601 |
| 2024/0153223 A1* | 5/2024 | Tovchigrechko | G06V 10/26 |
| 2025/0005868 A1* | 1/2025 | Singh | G06F 3/011 |

OTHER PUBLICATIONS

PCT/US2023/078361, "International Search Report and Written Opinion", Feb. 14, 2024, 12 pages.

"Spacesmart Automated Retail Space Planning Software", Available online at https://www.impactanalytics.co/solutions/retail-space-and-floor-planning/, Accessed from Internet on Feb. 16, 2023, 4 pages.

"ThincSoft Case Study", Available online at https://download.oracle.com/otndocs/products/spatial/pdf/osuc2008_presentations/osuc2008_thincsoft.pdf, Accessed from Internet on Feb. 15, 2023, 14 pages.

* cited by examiner

310
RECEIVING IMAGE DATA GENERATED BY A CAMERA OF A DEVICE DURING AN AUGMENTED REALITY (AR) SESSION AND SHOWING AT LEAST AN EXISTING OBJECT IN A REAL-WORLD SPACE, THE EXISTING OBJECT HAVING A FIRST DIMENSION

320
DETERMINING A MULTI-DIMENSIONAL MODEL CORRESPONDING TO A TYPE OF THE EXISTING OBJECT AND HAVING A SECOND DIMENSION SMALLER THAN THE FIRST DIMENSION

330
DETERMINING A USER SELECTION OF PROPERTIES ASSOCIATED WITH THE TYPE OF THE EXISTING OBJECT

340
CONFIGURING THE MULTI-DIMENSIONAL MODEL TO INCLUDE THE PROPERTIES AND RETAIN THE SECOND DIMENSION

350
CAUSING THE DEVICE TO PRESENT, DURING THE AR SESSION, THE MULTI-DIMENSIONAL MODEL IN AN OVERLAY SUCH THAT THE AR SESSION SHOWS (I) AT LEAST A PORTION OF THE EXISTING OBJECT BASED ON THE IMAGE DATA AND (II) THE MULTI-DIMENSIONAL MODEL OVER A REMAINING PORTION OF THE EXISTING OBJECT AND CONFIGURED ACCORDING TO THE PROPERTIES AND THE SECOND DIMENSION

*FIG. 3*

FIG. 4A 450 (e.g. displayed in user interface 211)

COMPACT AUGMENTED REALITY VIEW EXPERIENCE

TECHNICAL FIELD

This disclosure generally relates to three-dimensional (3D) modeling in support of augmented reality (AR) applications. More specifically, but not by way of limitation, this disclosure relates to providing a compact AR view to facilitate evaluation of and/or editing of models.

BACKGROUND OF THE INVENTION

Modeling objects for display in computer-based simulated environments (e.g., virtual reality and/or augmented reality environments) can be useful for applications in the physical world. For example, virtual models (e.g., virtual model of a kitchen including countertops, cabinets, appliances, etc.) of physical environments can be displayed in a virtual reality environment and/or an augmented reality environment. Viewing and editing a virtual model in an augmented reality environment can help a user visualize how edits to the virtual model will affect an appearance of the installed/constructed physical objects in the environment.

However, conventional augmented reality views of virtual models are often displayed using dimensions that are scaled from the original virtual model, which may lead to visual inconsistencies, such as object dimensions that do not correspond to dimensions of the physical environment. For example, a kitchen model displayed in an augmented reality view that is merely a scaled version of a full virtual model may result in countertop heights that are not correct/realistic when the scaled model is aligned with a floor plane.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present disclosure describes techniques for providing, by a virtual modeling system to a user device, a compact augmented reality view of a virtual model.

In certain embodiments, a modeling system receives image data generated by a camera of a device during an augmented reality (AR) session and showing at least an existing object in a real world space. The existing object has a first dimension along an axis of a predefined coordinate system. The modeling system determines a multi-dimensional model corresponding to a type of the existing object and having a second dimension smaller than the first dimension. The second dimension is along the axis of the predefined coordinate system. The modeling system determines a user selection of properties associated with the type of the existing object. The modeling system configures the multi-dimensional model to include the properties and retain the second dimension. The modeling system causes the device to present, during the AR session and using the predefined coordinate system, the multi-dimensional model in an overlay such that the AR session shows (i) at least a portion of the existing object based on the image data and (ii) the multi-dimensional model over a remaining portion of the existing object and configured according to the properties and the second dimension.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

For a fuller understanding of the nature and advantages of the present invention, reference should be made to the ensuing detailed description and accompanying drawings.

DETAILED DESCRIPTION OF THE INVENTION

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

With reference to the embodiments described herein, a computing environment may include a modeling system, which can include a number of computing devices, modeling applications, and a data store. The modeling system may be configured to store a virtual model of a physical environment (e.g., a model of a kitchen, a model of a bedroom). The virtual model includes virtual objects corresponding to existing physical objects and an arrangement of the virtual objects. The virtual model of the store can be presented in a computer-based simulated environment, such as in a virtual reality environment and/or an augmented reality environment.

The following non-limiting example is provided to introduce certain embodiments. In this example, a modeling system stores a virtual model of a physical object. The modeling system also stores an augmented reality (AR) model that is smaller in at least file size than the virtual model and that is associated with a type of the physical object. The AR model can help a user simulate how the physical object appears in a physical environment of the user device. Rather than using the virtual model in an AR session for the simulation, the AR model can be used, thereby reducing the processing burden in the AR session. User interactions with the AR model can be received in the AR session. At least some of these interactions can edit properties of the AR model. The edits can be reflected in the virtual model without the need to load the virtual model in the AR session. Nonetheless, it is possible to present in the AR session the virtual model (e.g., before and/or after it is updated).

In an example, a user desires to replace a kitchen countertop (an existing physical object) and operates a user device to simulate how the replacement may look like (e.g., a replacement physical object). A modeling system may store a virtual model for the replacement physical object, where this virtual model models the replacement object by including various properties (e.g., dimensions, type of material, color, etc.). The modeling system may also store an AR model associated with kitchen countertops in general. This AR model may, in a way, model a physical sample of kitchen countertops by including various properties (e.g., dimensions, type of material, color, etc.). The AR model is smaller in file size and may include a smaller number of properties than the virtual model. The user devices executes a modeling application that presents an AR session on the user device. The modeling system receives image data generated by the user device during the AR session. The modeling system detects the existing countertop (a physical object) within a field of view of a camera of the user device. Rather than showing the replacement countertop in the AR session by using the virtual model, the modeling system sends the AR model to the device. The compact AR model has smaller dimensions (e.g., 2 feet×1 foot) than dimensions of the virtual model (e.g., 8 feet×10 feet), and represents a sample of the replacement object. In the AR session, the AR model is shown as if it is sample that is placed on or near the physical countertop. The user can interact with the compact AR model to provide inputs to change the color, texture, and/or or other properties of the AR model. The modeling system updates the virtual model based on the inputs modifying properties of the compact AR model in the AR session. For example, the color and texture properties of the virtual model are updated to reflect the color and texture inputted in the AR session. The user can request the computing device to present the virtual model. At this point, the virtual model can be presented in the AR session instead of the AR model such that the AR session shows the replacement object with the updated properties.

In another example, the user desires to simulate an entire kitchen replacement. Here, the modeling system stores a virtual model for the entire kitchen replacement and this virtual model includes multiple virtual objects. Each virtual object models a physical object that belongs to the kitchen (e.g., one for a countertop, one for a cabinet, etc.). Further, the modeling system store an AR model for the entire kitchen, where this AR model includes multiple AR objects. Each AR object corresponds to one of the physical objects and models a sample of the physical object. The user operates the user device that then presents the AR session. Rather than showing the virtual model of the entire replacement kitchen in the AR session, the modeling system causes the user device to display the AR model in the AR session. In particular, the AR session shows the existing kitchen including the various existing physical objects. Next to or on each of the shown physical objects, the AR session shows a corresponding AR object (as an overlaid sample of the replacement object). The user can interact with the AR model and/or any of the shown AR objects to make property edits. The modeling system can update the virtual model and/or the virtual objects thereof as applicable. The updated virtual model can then be shown in the AR session.

Although the examples above involve modeling kitchen items and kitchen spaces, the methods described herein are applicable to a wide variety of physical object types and spaces. For example, the modeling system can generate compact AR models for living rooms, patios, dining rooms, classrooms, and other environments.

Providing the compact AR model for display in user device AR sessions, as described herein, provides several improvements and benefits over conventional techniques. For example, embodiments of the present disclosure provide a modeling system that enables a simplified user interface for visualizing models in AR and for editing properties of models that affect an appearance of the models. Certain embodiments described herein address the limitations of conventional modeling systems by displaying the compact AR model, which has a smaller file size than a file size of the corresponding virtual model. By only including, in the compact AR model, a subset of virtual items present in the virtual model, a speed of rendering the user interface can be increased. Further, by only displaying a subset of virtual items from the full virtual model, the compact AR model provides an improved user interface for editing. For example, a user can apply a property change to a single object in the compact AR model and this property change can be propagated to multiple like objects in the associated full virtual model. Applying a similar edit to a virtual model would require more user interface operations, for example, a separate selection of all like objects in addition to selecting a new property to apply to the selected group of objects. Also, displaying the compact AR model improves the evaluation power for the user because the compact AR model occupies less volume in the field of view compared to a conventional display of the full virtual model, which enables the user to more effectively compare properties of objects in the compact AR model to properties of physical objects in the physical environment within the field of view upon which the compact AR model is not overlayed. Further, displaying the compact AR model provides an improved user interface for evaluating models over conventional displays of a scaled version of the model, which can result in objects in the scaled model being out of proportion compared to dimensions of the physical environment of the user computing device.

Figure 1:
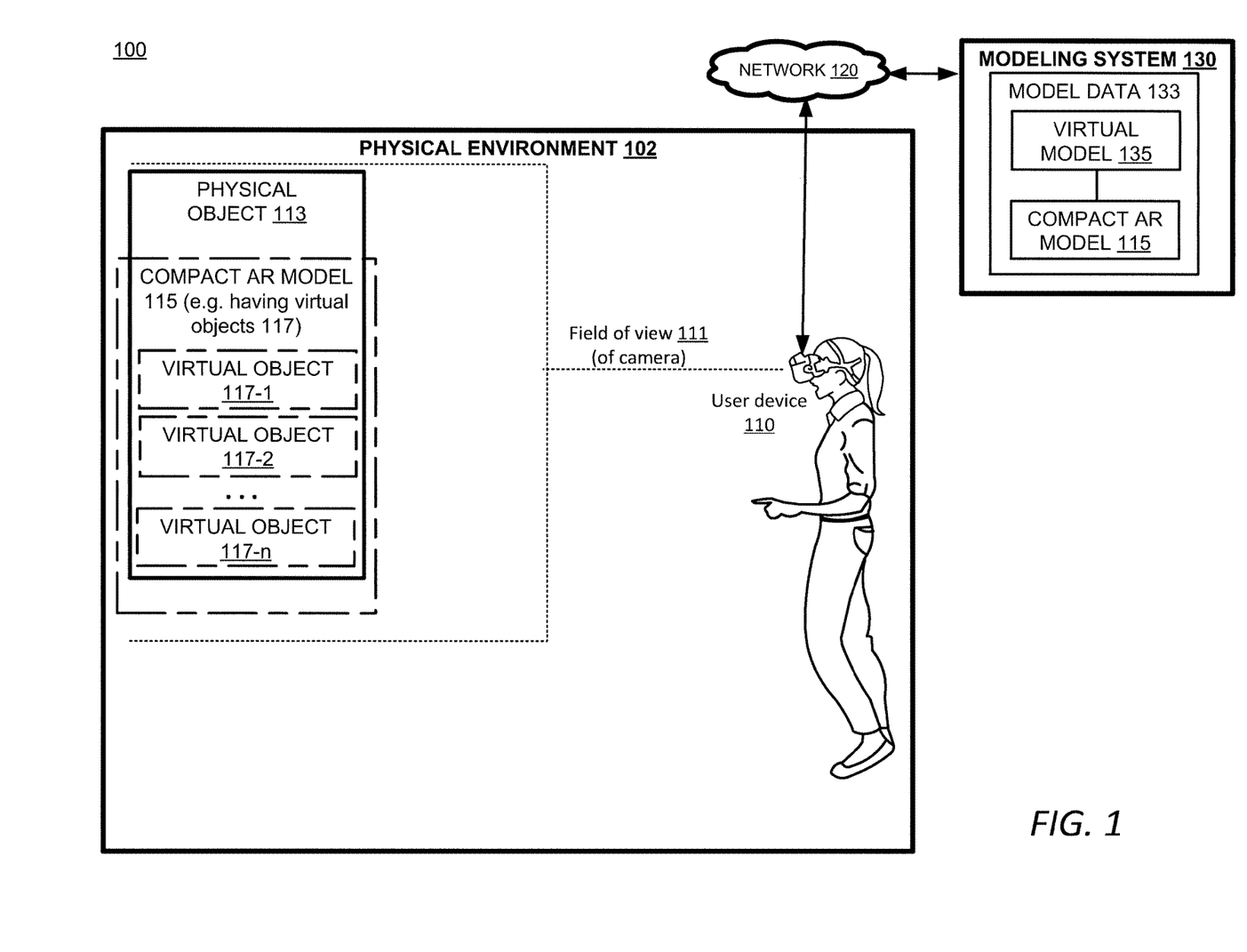
FIG. 1 illustrates an example of a computing environment for providing, by a modeling system via a user device, a compact view of a virtual model in an augmented reality environment, according to certain embodiments disclosed herein.

Referring now to the drawings, FIG. 1 depicts an example of a computing environment 100 for providing, by a modeling system 130 via a user computing device 110, a compact view of a virtual model in an augmented reality (AR) environment, according to certain embodiments disclosed herein. The modeling system 130 can include one or more processing devices that execute one or more modeling applications. In certain embodiments, the modeling system 130 includes a network server and/or one or more computing devices communicatively coupled via a network 120. The modeling system 130 may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. Based on the present disclosure, one of the ordinary skill in the art would recognize many possible variations, alternatives, and modifications. In some instances, the modeling system 130 provides a service that enables display of virtual objects in an augmented and/or virtual reality environment for users, for example, including a user associated with a user device 110. In the example depicted in FIG. 1, a user device 110 displays, in an AR session, a compact AR model 115 within a field of view 111 of the user device 110. As shown in FIG. 1, the compact AR model 115 is displayed within a portion of the field of view 111 and physical objects 113 are displayed within another portion of the field of view 111. In some instances, the compact AR model 115 is overlayed on one or more physical objects 113 so that it occludes the one or more overlayed physical objects 113. The compact AR model 115 comprises an arrangement of virtual objects 117. For example, the compact AR model 115 has n virtual objects 117-1, 117-2, . . . 117-n. Although the user device 110 is depicted in FIG. 1 as being a wearable device, the user device 110 could be other devices other than a wearable device 110. For example, the user device 110 could be a smart phone device, a tablet device, or other user device 110.

In some embodiments, as depicted in FIG. 1, the user device 110 communicates via the network 120 with a modeling system 130, which stores model data 133 defining the compact AR model 115. The model data 133 also defines a virtual model 135 associated with the compact AR model 115. In some instances, multiple compact AR models 115 are associated with a single virtual model 135. In other embodiments, the user device 110 comprises the modeling system 130 and the user device 110 can perform all the processing described herein as being performed by the modeling system 130 on the user device 110 without needing to communicate via the network 120.

Figure 2:
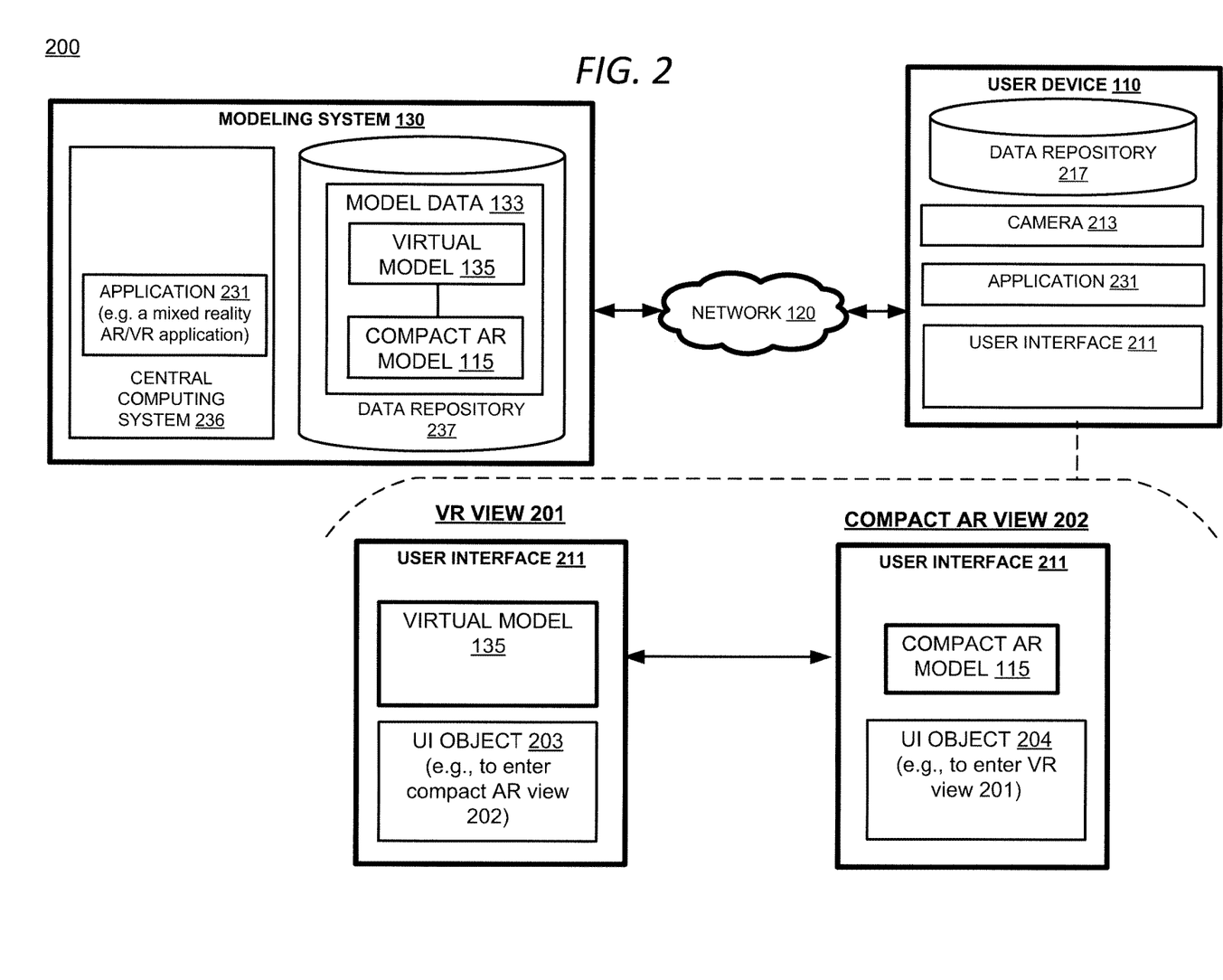
FIG. 2 depicts further details of the computing environment of FIG. 1, according to certain embodiments disclosed herein.

FIG. 2 depicts further details of the computing environment of FIG. 1, in accordance with certain embodiments described herein. Elements that are found in FIG. 1 are further described in FIG. 2 and referred thereto using the same element numbers. In certain embodiments, the modeling system 130 includes a central computer system 236, which supports an application 231. The application 231 could be a mixed reality application. For example, a mixed reality includes an augmented reality ("AR") and/or a virtual reality ("VR"). The application 231 enables a presentation of a compact AR model 115 and/or a virtual model 135 of the physical environment 102 in a compact AR view 202 and/or VR view 201, respectively. The application 231 may be accessed by and executed on a user device 110 associated with a user of one or more services of the modeling system 130. For example, the user accesses the application 231 via a web browser application of the user device 110. In other examples, the application 131 is provided by the modeling system 130 for download on the user device 110. As depicted in FIG. 2, the user device 110 communicates with the central computer system 236 via the network 120. Although a single user device 110 is illustrated in FIG. 2, the application 231 can be provided to (or can be accessed by) multiple user devices 110. Further, although FIG. 2 depicts a modeling system 130 that is separate from the user device 110 and that communicates with the user device 110 via the network 120, in certain embodiments the modeling system 130 is a component of the user device 110 and the functions described herein as being performed by the modeling system 130 are performed on the user device 110.

In certain embodiments, the modeling system 130 comprises a data repository 217. The data repository 217 could include a local or remote data store accessible to the central computer system 236. In some instances, the data repository 217 is configured to store the model data 133 defining the compact AR model 115 and its associated virtual model 135. As shown in FIG. 2, the user device 110 comprises, in some instances, a data repository 217, a camera 213, the application 231, and a user interface 211. The data repository 217 could include a local or remote data store accessible to the user device 110. The camera 213 communicates with the application 231. The camera 213 is able to capture a field of view 111 as depicted in FIG. 1. The user interface 211 enables the user of the user device 110 to interact with the application 231 and/or the modeling system 130. The user interface 211 could be provided on a display device (e.g., a display monitor), a touchscreen interface, or other user interface that can present one or more outputs of the application 231 and/or modeling system 130 and receive one or more inputs of the user of the user device 110. The user interface 211 can include a compact AR view 202 which can present the compact AR model 115 within the compact AR view 202. The user interface 211 can also display a user interface (UI) object 204 in the compact AR view 202. Responsive to detecting a selection of the UI object 204, the modeling system 130 can cease displaying the compact AR view 202 that includes the compact AR model 115 and begin displaying a VR view 201 including the virtual model 135 associated with the compact AR model 115. The user interface 211 can also display a user interface (UI) object 203 in the VR view 201. Responsive to detecting a selection of the UI object 203, the modeling system 130 can cease displaying the VR view 201 that includes the virtual model 135 and begin displaying the compact AR view 202 including the compact AR model 115 associated with the virtual model 135. As illustrated in FIG. 2, the modeling system 130 can alternate between displaying, via the user interface 211, the VR view 201 and the compact AR view 202 responsive to detecting selection of the UI object 203 and UI object 204.

Figure 3:
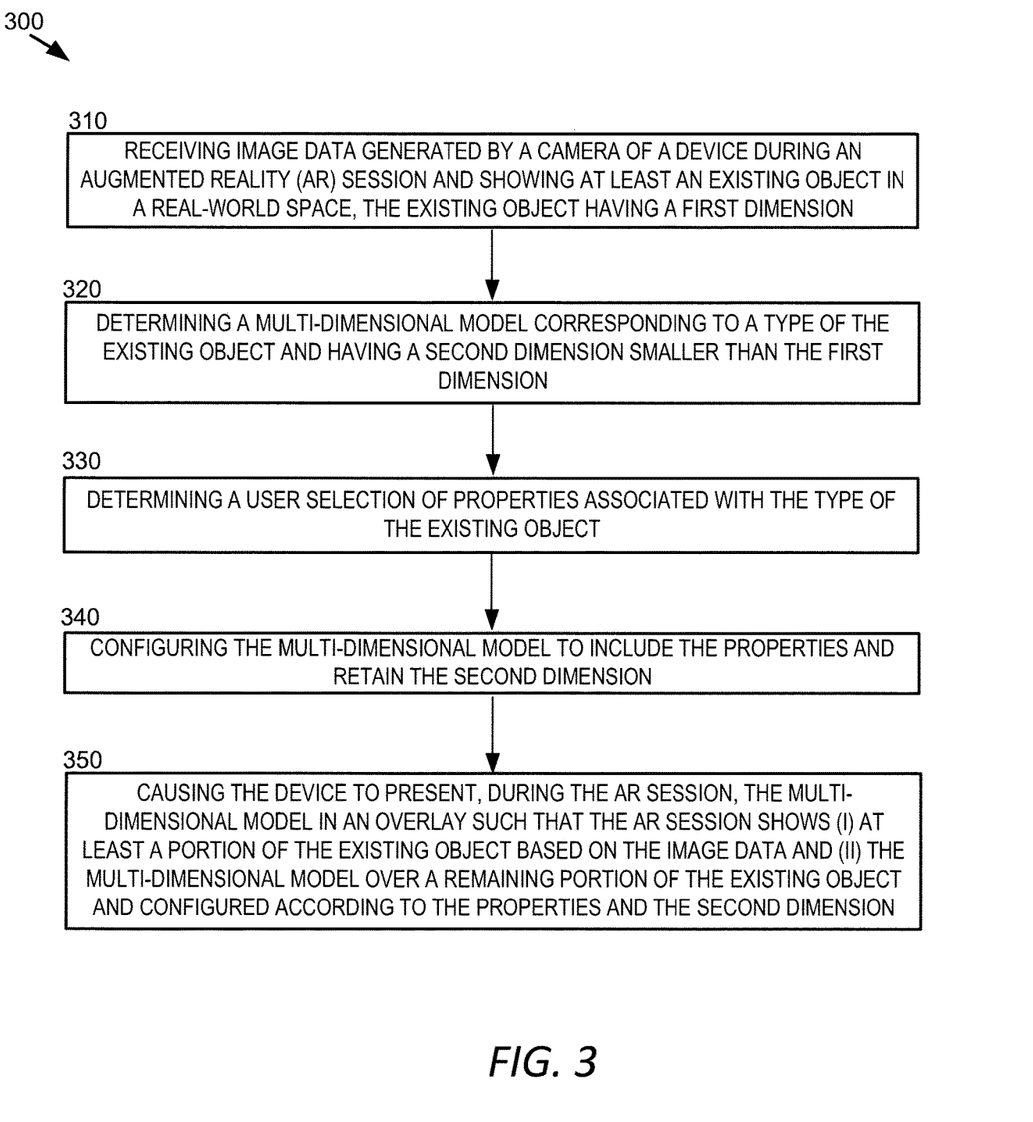
FIG. 3 depicts an example of a method for editing, by a modeling system, a virtual model based on edits made to a compact AR view displayed via a user computing device, according to certain embodiments disclosed herein.

FIG. 3 depicts an example of a method for editing, by a modeling system 130, a virtual model 135 based on edits made to a compact AR model 115 displayed via a user device 110, according to certain embodiments disclosed herein. One or more computing devices (e.g., the application 231 included herein) implement operations depicted in FIG. 3. For illustrative purposes, the method 300 is described with reference to certain examples depicted in the figures. Other implementations, however, are possible.

In certain embodiments, as described in the following steps of method 300, the modeling system 130 performs the steps of method 300. However, in other embodiments, the steps of method 300 can be performed solely by the user device 110 without the user device 110 needing to communicate with a modeling system 130 via the network 120.

At block 310, the method 300 involves receiving, by the modeling system 130, image data generated by a camera 213 of a user device 110 during an AR session and showing at least an existing object in a physical space, the existing object having a first dimension. The AR session, which displays the compact AR view 202, shows at least an existing physical object 113 in a physical environment 101 within a field of view 111 of the user device 110. For example, the user of the user device 110 may access a modeling application 231 on the user device 110, which communicates with the modeling system 130. In some instances, the user can request to initiate the AR session (e.g. the compact AR view 202) by selecting a user interface 211 object in the modeling application 231. The modeling application may instruct the camera 213 of the user device 110 to begin to capture image/video data within a field of view 111 of the user device 110. The user may aim the camera 213 such that the field of view 111 of the user device 110 is within the physical environment 102 in which the user wishes to remodel or furbish. For example, the user wishes to remodel a kitchen area, a living room area, or other physical environment 102. In an example, a first dimension of the existing physical object 113 corresponds to a floor plane, a wall plane, a length of one or more objects of the physical environment 102 (e.g. a length of three counter/cabinet sections), or other dimension of the physical object 113 in the physical environment 102. For example, a first dimension of the existing physical object 113 corresponds to a 30 foot length floor in the physical environment 102. In some instances, the dimension is defined with respect to a predefined coordinate system. For example, the first dimension could be along a Y axis of a predefined coordinate system.

At block 320, the method 300 involves determining, by the modeling system 130, a multi-dimensional model (compact AR model 115) corresponding to a type of the existing physical object 113 and having a second dimension smaller than the first dimension. The type of the existing physical object 113 could include a kitchen type object (e.g. multiple sections of countertop), a living room type object (e.g. a sofa and a coffee table), an outdoor type object (e.g. a brick grill), or other type of physical object 113. The second dimension (e.g., a 4 foot length floor) of the compact AR model 115 is less than the first dimension of the existing object (e.g. a 30 foot length floor in the physical environment). In some instances, the second dimension is defined with respect to a same predefined coordinate system as the first dimension. For example, the first dimension and the second dimension could be along a Y axis of the predefined coordinate system. In some embodiments, when transitioning from the virtual model 135 to the compact AR model 115 and/or vice versa, the first dimension and the second dimension along the same axis (e.g. a y width axis) can vary while the dimensions of virtual objects along the other axes (e.g. an x depth axis and a z height axis) of the predefined coordinate system remain the same.

Figure 4A:
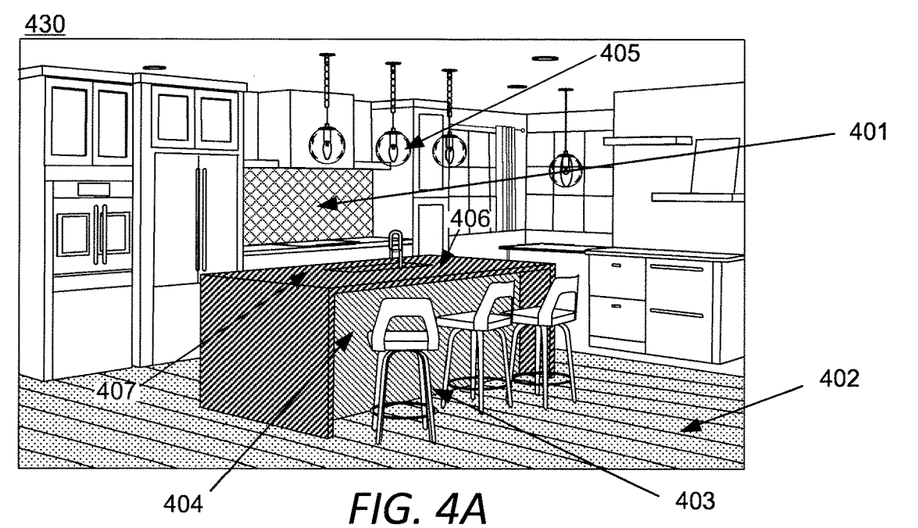
FIG. 4A depicts an illustration of an example virtual model, according to certain embodiments disclosed herein.
Figure 4B:
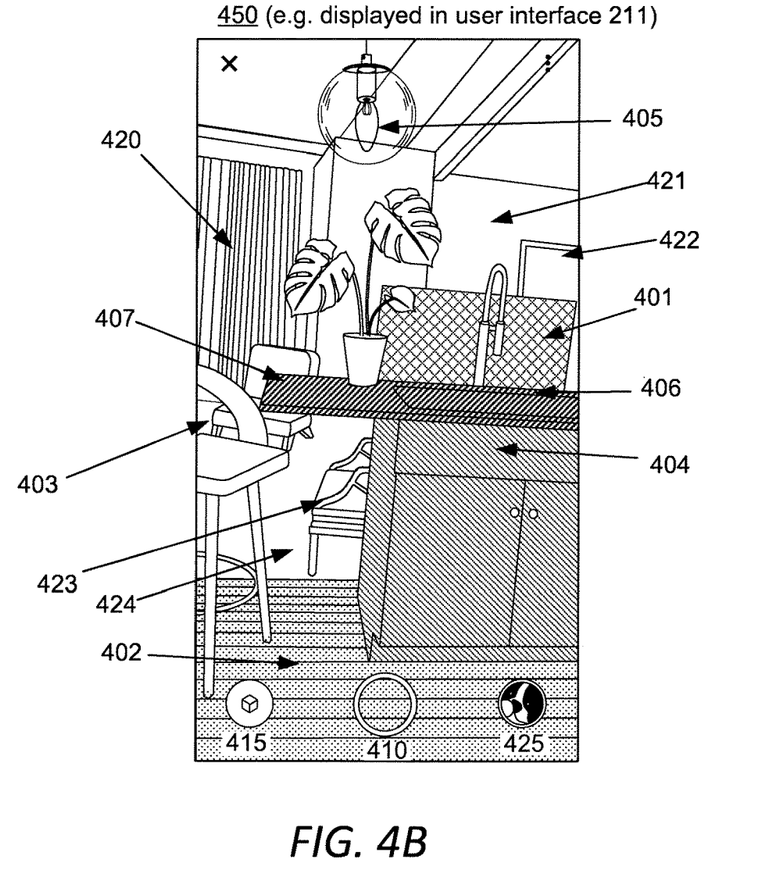
FIG. 4B depicts an illustration of an example compact AR model based on the virtual model of FIG. 4A, displayed in a user interface, according to certain embodiments disclosed herein.

The compact AR model 115 is associated with a virtual model. In some instances, the virtual model includes a set of virtual objects and the compact AR model includes a subset of the set of virtual object. For example, the virtual model 135 is a model of an entire kitchen area which the user is considering placing in the physical environment 102 and the compact AR model 115 is a model of a subset of particular objects of the virtual model 135. In this example, the virtual model 135 could include a specific arrangement of eight countertop/cabinet objects, one sink/cabinet object, 20 floor section objects, and four barstools, and the compact AR model 115 includes an arrangement of one countertop/cabinet object, the sink/cabinet object, five floor section objects, and one barstool. In some embodiments, multiple compact AR models 115 are associated with a virtual model 135 and the user can select a particular compact AR model 115 from among the multiple compact AR models 115. For example, for a virtual model 135, the arrangement of the objects may vary between compact AR models 115 associated with the virtual model 135 or the objects within the compact AR models 115 associated with the virtual model 135 may vary. For example, a first compact AR model 115 has a barstool on a left side of a countertop object, and a sink/cabinet object on a right side of the countertop object, and a second compact AR model 115 has the barstool in front of the countertop object and the sink/cabinet object on a left side of the countertop object. In this example, both the first compact AR model 115 and the second compact AR model 115 are associated with a same virtual model 135 of a kitchen. In some embodiments, the modeling system 130 generates, responsive to receiving the user selection of properties, the virtual model 135, where the virtual model 135 includes a virtual object 117 generated according to the selected properties and including information to replace the existing physical object 113. FIG. 4A depicts a virtual model 135 and FIG. 4B depicts a compact AR model 115 for the virtual model 135 of FIG. 4A.

Figure 5:
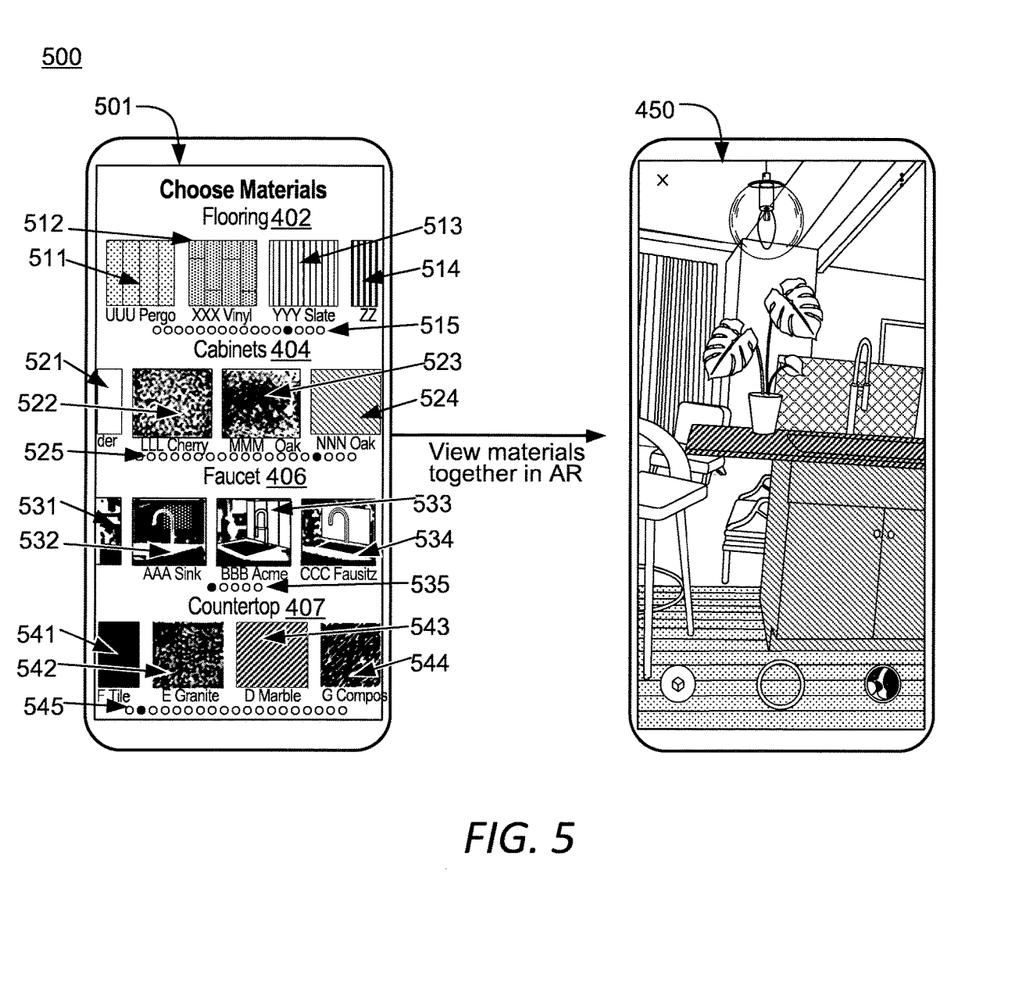
FIG. 5 depicts an example illustration of an interface for editing objects in the example compact AR model of FIG. 4B, according to certain embodiments disclosed herein.

At block 330, the method 300 involves determining, by the modeling system 130, a user selection of properties associated with the type of the existing physical object 113. For example, the type of existing object is "kitchen object" and, responsive to determining the type, the modeling system 130 presents, via the user interface 211, one or more predefined properties combinations (e.g. templates) for a kitchen. Properties define, for each object of the compact AR model 115 (and for the associated virtual model 135), one or more of a color, a texture, a volume, a surface area, dimensions, style, or other physical property that affects an appearance of the virtual objects 117 within the compact AR model 115. For example, the user could select a contemporary kitchen template, a farmhouse kitchen template, a 1960s-style kitchen template, or other template, where each template includes a respective set of properties for the virtual objects 117 in the compact AR model 115. For example, a first template includes a wood floor, a butcher block countertop, a wooden barstool with no cushion, and a steel double sink, whereas a second template includes a checkerboard tile floor, a granite texture countertop, a metal barstool with a cushion, and a single sink. In some instances, the modeling system 130 assigns a default set of properties (e.g. a default template) to the compact AR model 115. In some instances, instead of selecting among templates which define properties for multiple virtual objects 117 in the compact AR model 115, the user can select an individual virtual object (e.g., virtual object 117-1) and define a property for the selected virtual object 117-1. FIG. 5 depicts an example of a user interface 211 for defining properties for virtual objects 117 of a compact AR model 115.

At block 340, the method 300 involves configuring, by the modeling system 130, the multi-dimensional model (compact AR model 115) to include the properties defined in block 330 and to retain the second dimension. The properties of objects in the compact AR model 115, as previously discussed in block 330, may correspond to a selected template, (e.g. a style template) correspond to a default set of properties, or correspond to properties assigned for each particular virtual object 117 of the compact AR model 115. In some instances, the modeling system 130 configures the compact AR model 115 by applying a set of properties responsive to detecting a selection of the template that defines the set of properties. In some instances, the modeling system 130 configures the compact AR model 115 by applying the default set of properties to the respective virtual objects 117 of the AR model 115. For example, the user selected grey wood-texture luxury vinyl plank for a flooring section virtual object 117 and granite for a countertop virtual object 117. As previously discussed, the second dimension of the compact AR model is less than the first dimension of the existing physical object 113. For example, the second dimension is four feet long and the first dimension is thirty feet long. The modeling system 130 does not resize or otherwise scale the compact AR model 115 to correspond to dimensions of the existing physical object 113. Instead, the modeling system retains the second dimension defined for the compact AR model 115 for display in the compact AR view 202.

At block 350, the method 300 involves causing, by the modeling system 130, the user device 110 to present, during the AR session, the multi-dimensional model (the compact AR model 115) in an overlay such that the AR session shows (i) at least a portion of the existing physical object 113 based on the image data and (ii) the multi-dimensional model (the compact AR model 115) over a remaining portion of the existing physical object 113 and configured according to the properties and the second dimension. In the overlay, as depicted in FIG. 1, the AR session shows at least a portion of the existing physical object based on the image data from the camera of the user computing device, wherein this portion is not overlayed by the compact AR model 115. For example, the existing physical object is a physical area of a kitchen in a home and the portion of the existing physical object includes a first section of floor and a first countertop section in the kitchen. In the overlay, as depicted in FIG. 1, the AR session shows the multi-dimensional model (compact AR model) over a remaining portion of the existing physical object 113. In certain embodiments, the overlay is presented using the predefined coordinate system. The remaining portion of the existing physical object 113 is occluded by the compact AR model 115. For example, the portion is the first section of floor and first countertop section in the kitchen and the remaining portion of the kitchen correspond to subsequent sections of floor other than the first floor section and other sections of countertop other than the first countertop section. As previously discussed, the multi-dimensional model (compact AR model 115) is configured according to the properties and the second dimension, which is smaller than the first dimension of the existing real-world object. Accordingly, the displayed compact AR model includes the properties (e.g. properties corresponding to selected template) and also retains the second dimension associated with the compact AR model 115. In some instances, the user can change the location of the compact AR model 115 within the field of view 111 in compact AR view 202. In some instances, the compact AR model 115 has one or more dimensions that are different from the first dimension of the physical object 113. In some instances, the compact AR model 115 comprises a virtual object 117 corresponding to a physical object that is available to replace the existing physical object 113. For example, the virtual object 117 is a granite countertop section that is available to replace an existing marble countertop physical object 113 in the physical environment 102.

In some instances, causing the user device 110 to present the compact AR model 115 includes detecting a reference plane in the physical environment 102 based on the image data and determining that the existing physical object 113 is at a first distance relative to the reference plane. For example, the reference plane could be a floor plane, a counter top plane, or other reference plane of the physical environment 102. Presenting the compact AR model 115 can include aligning the compact AR model 115 using the reference plane such that the compact AR model 115 is shown at a second predefined distance relative to the reference plane. In some embodiments, the modeling system 130 initially displays the virtual model 135 in the VR view 201 and, responsive to receiving an input at the user interface 211 in the VR view 201, causes the user device 110 to cease displaying the VR view 201 and being displaying the compact AR view 202. In the VR view 201, the virtual model occludes all objects in the physical space including the existing physical object 113. In some instances, the compact AR model 115 comprises data associated with the existing physical object 113 in the physical environment 102 and also provides this data for display via the user interface 211 in the compact AR view 202.

In some instances, the user can change one or more properties of virtual objects 117 of the compact AR model 115 via the user interface 211 and the modeling system 130 updates the compact AR model 115 to display the compact AR model 115 with the updated properties in the compact AR view 202. For example, the modeling system 130 receives, at the user device 110 via the displayed compact AR view 115 in compact AR view 202 (e.g. the AR session), a request to change the selected properties to second properties. In this example, the modeling system 130 by configures the compact AR model 115 to include the second properties. In this example, the modeling system 130 causes the user device 110 to present, during the AR session, the updated compact AR model 115 in a subsequent overlay. In some instances, the modeling system 130 can propagate changes made to object properties in the compact AR model 115 to the associated virtual model 135. For example, the modeling system 130 updates at least one virtual object 117 in the virtual model 135 by changing properties of the at least one virtual object 117 to the second properties. In some instances, a second compact AR model 115 also corresponds to the type of the existing physical object 113 and, responsive to receiving, at the user device 110, an input in the AR session, the modeling system 130 configures the second compact AR model 115 to include at least one property different from the properties of the compact AR model 115 and to retain the second dimension. The modeling system 130 can cause the user device 110 to display the second compact AR model 115 instead of the originally displayed compact AR model 115.

FIG. 4A depicts an illustration of an example virtual model 430 (e.g. one example of a virtual model 135 of FIG. 1), according to certain embodiments disclosed herein. The virtual model 430 can be displayed in a VR view 201 of the user interface 211, as depicted in FIG. 1. The example virtual model 430 includes various virtual objects 117, for example, backsplash virtual object 401, flooring virtual object 402, chair virtual object 403, cabinet virtual object 404, light fixture virtual object 405, faucet/sink virtual object 406, and countertop virtual object 407. As can be seen in FIG. 4A, there are multiple instances of particular virtual objects in the virtual model 430, for example virtual objects 403 (chair) and 405 (light fixture).

FIG. 4B depicts an illustration of an example compact AR view 450 including a compact AR model 115 based on the virtual model of FIG. 4A, displayed in a user interface 211, according to certain embodiments disclosed herein. The depicted compact AR model 115 includes virtual objects 401, 402, 403, 404, 405, 406, and 407 from the virtual model 430 of FIG. 4A. Unlike the virtual model 430, the compact AR model 115 has only a single chair object 403 and a single light fixture object 405. Further, the compact AR model 115 has less area of flooring virtual object 402, countertop virtual object 407, cabinet virtual object 404, and backsplash virtual object 401. Further, the AR model 115 is overlayed over existing physical objects 113 in a physical environment 102 of the user device 110 and leaves a portion of existing physical objects 113 in the field of view 111 visible, for example, physical objects 420 (window object), 421 (wall object), 422 (picture frame object), 423 (living room chair object), and 424 (living room carpet object). As depicted in FIG. 4B, the compact AR model 115 displayed in the compact AR view 202 of the user interface 212 enables the user to evaluate visual characteristics/properties of virtual objects 117 of the virtual model 135 without having to display the full virtual model 135 and also enables a comparison between the visual properties and properties of non-occluded physical objects 113 in the field of view 111 that are not occluded by the overlay of the compact AR model 115. Further, the compact AR view 202 includes user interface object 415, which enables transition from the compact AR view 202 to the VR view 201 of the virtual model 430, user interface object 410, which enables capturing an image of the user interface 211, and user interface object 425, which enables transition of the user interface 211 to display an editing interface that is described in further detail in FIG. 5.

FIG. 5 depicts an example illustration of an editing interface 501 for editing objects in the example compact AR model of FIG. 4B, according to certain embodiments disclosed herein. The compact AR model 115 depicted in FIG. 4B is displayed in the user interface 211 as depicted in the right side of FIG. 5, and includes all of the features described above in FIG. 4B. In some instances, the modeling system 130 causes the user device 110 to display the editing interface 501 responsive to detecting selection of user interface object 425. The example editing interface 501 of FIG. 5 includes carousel interface objects 515, 525, 535, 545, for cycling through user interface objects 511, 512, 513, 514 for selecting properties for flooring virtual object 402, user interface objects 521, 522, 523, and 524 for selecting properties for cabinet virtual object 404, user interface objects 531, 532, 533, and 534 for selecting properties for a faucet virtual object 406, and user interface objects 541, 542, 543, and 544 for selecting properties for a countertop virtual object 407. For example, the user may select any of the displayed user interface 211 objects to define a property for a virtual object 117 of compact AR model 115. In some instances, as indicated in FIG. 5, the user can view, in the compact AR view 202, the compact AR model 115 with properties corresponding to selected user interface 211 objects of particular virtual objects 117 in the editing interface 501.

Figure 6:
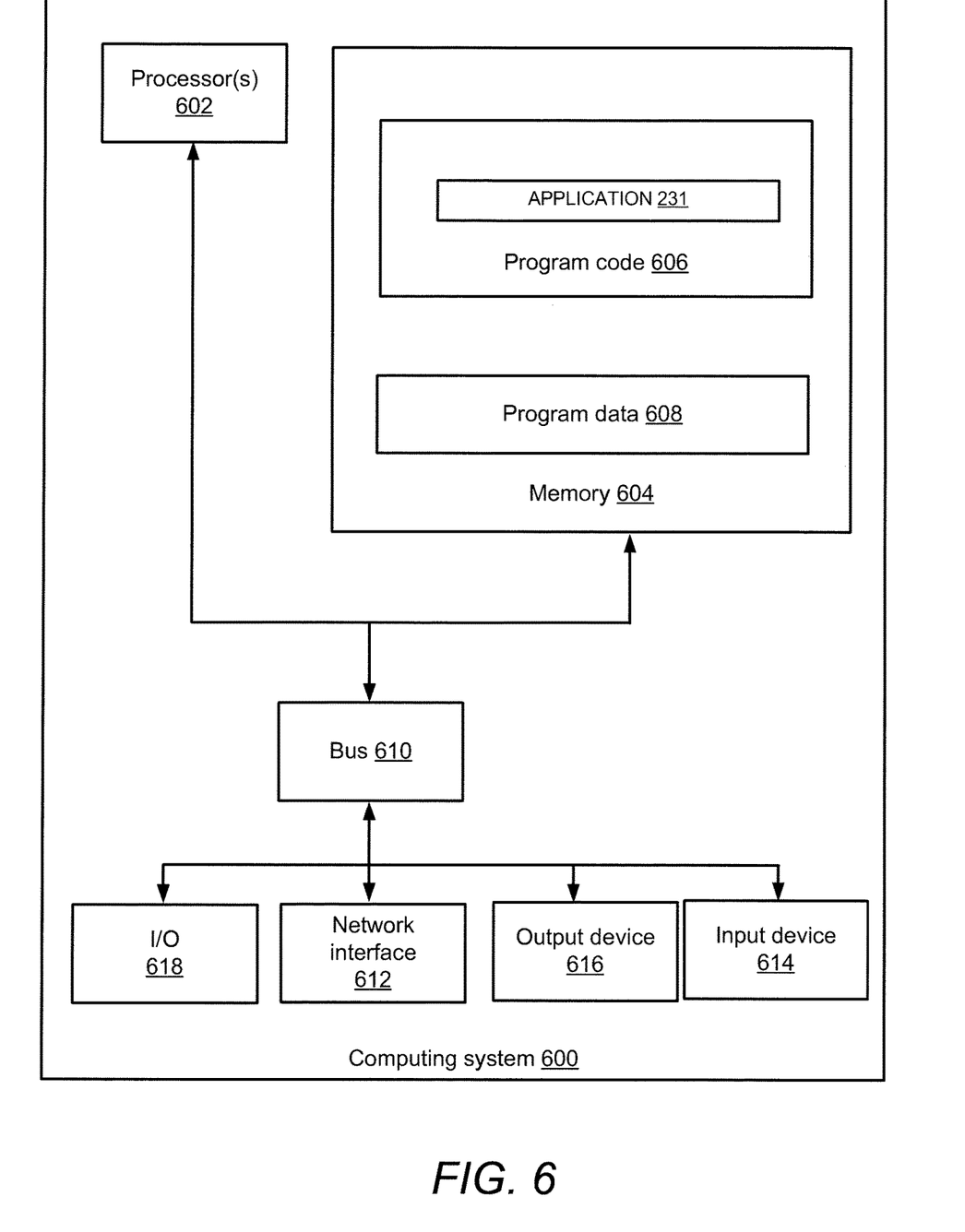
FIG. 6 depicts an example of a computing system that performs certain operations described herein, according to certain embodiments described in the present disclosure.

Any suitable computer system or group of computer systems can be used for performing the operations described herein. For example, FIG. 6 depicts an example of a computer system 600. The depicted example of the computer system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing program code 606, program data 608, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 604 can be volatile memory, non-volatile memory, or a combination thereof.

The computer system 600 executes program code 606 that configures the processor 602 to perform one or more of the operations described herein. Examples of the program code 606 include, in various embodiments, the modeling system 130 and subsystems thereof (including the location determining subsystem 331, the subset selection subsystem 333, the mixed reality rendering subsystem 335, and the model data generating subsystem 337) of FIG. 1, which may include any other suitable systems or subsystems that perform one or more operations described herein (e.g., one or more neural networks, encoders, attention propagation subsystem and segmentation subsystem). The program code 606 may be resident in the memory device 604 or any suitable computer-readable medium and may be executed by the processor 602 or any other suitable processor.

The processor 602 is an integrated circuit device that can execute the program code 606. The program code 606 can be for executing an operating system, an application system or subsystem, or both. When executed by the processor 602, the instructions cause the processor 602 to perform operations of the program code 606. When being executed by the processor 602, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 604 store the program data 608 that includes one or more datasets described herein. In some embodiments, one or more of data sets are stored in the same memory device (e.g., one of the memory devices 604). In additional or alternative embodiments, one or more of the programs, data sets, models, and functions described herein are stored in different memory devices 604 accessible via a data network. One or more buses 610 are also included in the computer system 600. The buses 610 communicatively couple one or more components of a respective one of the computer system 600.

In some embodiments, the computer system 600 also includes a network interface device 612. The network interface device 612 includes any device or group of devices suitable for establishing a wired or wireless data connection to one or more data networks. Non-limiting examples of the network interface device 612 include an Ethernet network adapter, a modem, and/or the like. The computer system 600 is able to communicate with one or more other computing devices via a data network using the network interface device 612.

The computer system 600 may also include a number of external or internal devices, an input device 614, a presentation device 616, or other input or output devices. For example, the computer system 600 is shown with one or more input/output ("I/O") interfaces 618. An I/O interface 618 can receive input from input devices or provide output to output devices. An input device 614 can include any device or group of devices suitable for receiving visual, auditory, or other suitable input that controls or affects the operations of the processor 602. Non-limiting examples of the input device 614 include a touchscreen, a mouse, a keyboard, a microphone, a separate mobile computing device, etc. A presentation device 616 can include any device or group of devices suitable for providing visual, auditory, or other suitable sensory output. Non-limiting examples of the presentation device 616 include a touchscreen, a monitor, a speaker, a separate mobile computing device, etc.

Although FIG. 6 depicts the input device 614 and the presentation device 616 as being local to the computer system 600, other implementations are possible. For instance, in some embodiments, one or more of the input device 614 and the presentation device 616 can include a remote client-computing device (e.g., user device 110) that communicates with computing system 600 via the network interface device 612 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 7:
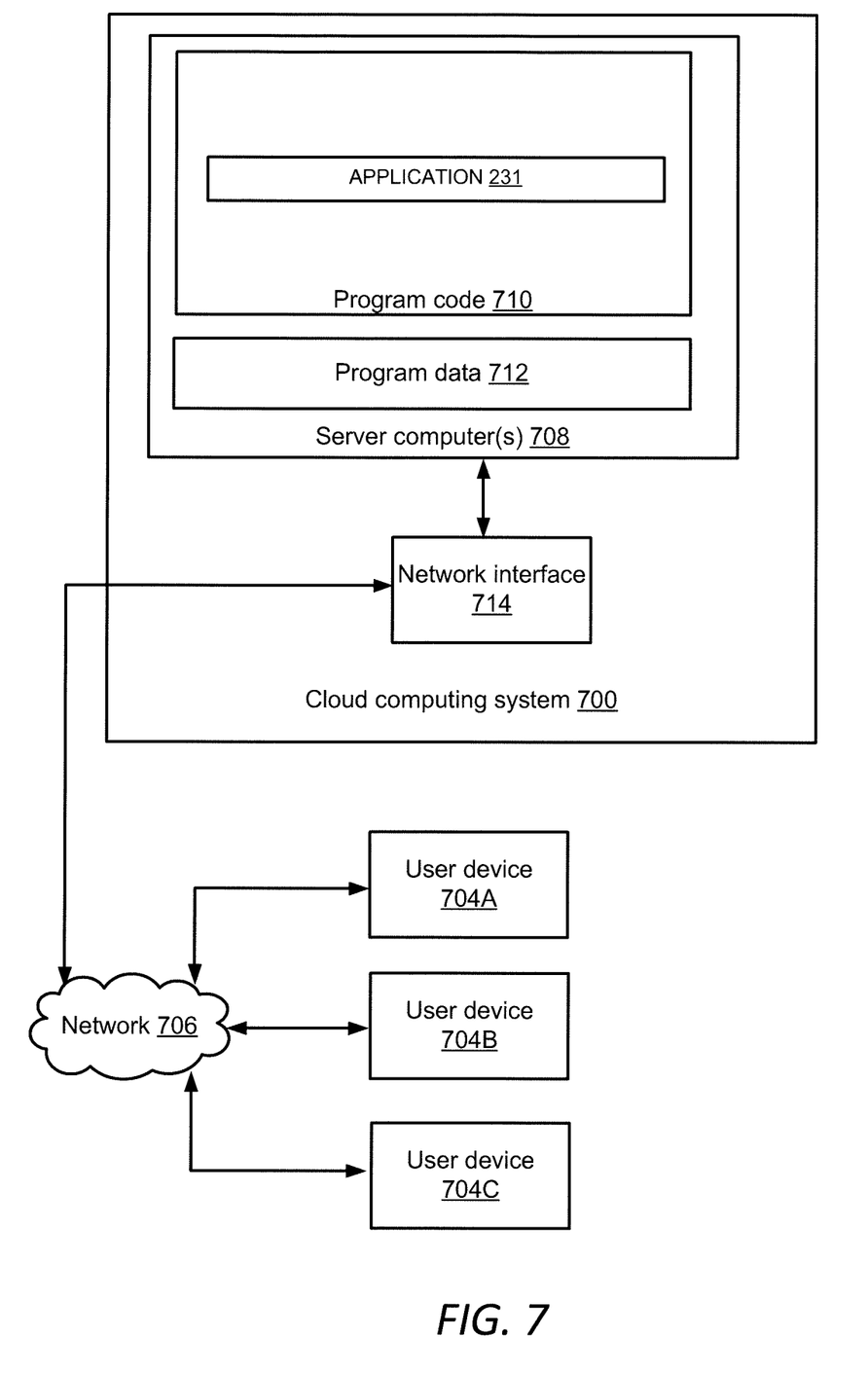
FIG. 7 depicts an example of a cloud computing system that performs certain operations described herein, according to certain embodiments described in the present disclosure.

In some embodiments, the functionality provided by computer system 600 may be offered as cloud services by a cloud service provider. For example, FIG. 7 depicts an example of a cloud computer system 700 offering a service for providing compact AR models 115 for generating mixed reality views of a physical environment 102. In the example, the service for providing compact AR models 115 for generating mixed reality views of a physical environment 102 may be offered under a Software as a Service (SaaS) model. One or more users may subscribe to the service for to provide compact AR models 115 for generating mixed reality views of a physical environment 102 and the cloud computer system 700 performs the processing to provide compact AR models 115 for generating mixed reality views of a physical environment 102. The cloud computer system 700 may include one or more remote server computers 708.

The remote server computers 708 include any suitable non-transitory computer-readable medium for storing program code 710 (e.g., including the application 231 of FIG. 2) and program data 712, or both, which is used by the cloud computer system 700 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 708 can include volatile memory, non-volatile memory, or a combination thereof. One or more of the server computers 708 execute the program code 710 that configures one or more processors of the server computers 708 to perform one or more of the operations that provide compact AR models 115 for generating mixed reality views of a physical environment 102.

As depicted in the embodiment in FIG. 7, the one or more servers providing the services for providing compact AR models 115 for generating mixed reality views of a physical environment 102 may implement the modeling system 130 central computing system 236, and the application 231. Any other suitable systems or subsystems that perform one or more operations described herein (e.g., one or more development systems for configuring an interactive user interface) can also be implemented by the cloud computer system 700.

In certain embodiments, the cloud computer system 700 may implement the services by executing program code and/or using program data 712, which may be resident in a memory device of the server computers 708 or any suitable computer-readable medium and may be executed by the processors of the server computers 708 or any other suitable processor.

In some embodiments, the program data 712 includes one or more datasets and models described herein. In some embodiments, one or more of data sets, models, and functions are stored in the same memory device. In additional or alternative embodiments, one or more of the programs, data sets, models, and functions described herein are stored in different memory devices accessible via the data network 706.

The cloud computer system 700 also includes a network interface device 714 that enable communications to and from cloud computer system 700. In certain embodiments, the network interface device 714 includes any device or group of devices suitable for establishing a wired or wireless data connection to the data networks 706. Non-limiting examples of the network interface device 714 include an Ethernet network adapter, a modem, and/or the like. The service for providing compact AR models 115 for generating mixed reality views of a physical environment 102 is able to communicate with the user devices 704A, 704B, and 704C via the data network 706 using the network interface device 714.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
receiving image data generated by a camera of a device during an augmented reality (AR) session and showing at least a first existing physical object in a physical space, the first existing physical object having a first dimension along a first axis of a predefined coordinate system and a second dimension along a second axis of the predefined coordinate system;
determining a multi-dimensional model corresponding to the first existing physical object that has a first model dimension along the first axis of the predefined coordinate system that is smaller than the first dimension and that has a second model dimension along the second axis of the predefined coordinate system, wherein the multi-dimensional model corresponds to a second physical object installable to replace the first existing physical object;
determining a user selection of properties from a set of properties associated with the first existing physical object;
configuring the multi-dimensional model to include the properties and retain the first model dimension; and
causing the device to present, during the AR session and using the predefined coordinate system, the multi-dimensional model in an overlay such that the AR session shows (i) at least a portion of the first existing physical object based on the image data and (ii) the multi-dimensional model over a remaining portion of the first existing physical object and configured according to the properties and the first model dimension.

2. The method of claim 1, wherein causing the device to present the multi-dimensional model in the overlay further comprises:
   detecting a reference plane based on the image data, wherein the first existing physical object is at a first distance relative to the reference plane; and
   aligning the multi-dimensional model within the overlay using the reference plane such that the multi-dimensional model is shown at a second predefined distance relative to the reference plane.

3. The method of claim 1, wherein the multi-dimensional model is associated with a virtual model including a first virtual object and a second virtual object, and wherein the multi-dimensional model corresponds to the first virtual object.

4. The method of claim 3, and wherein the second model dimension is different from the second dimension of the first existing physical object.

5. The method of claim 3, wherein the first virtual object includes properties that are the same as the selected properties.

6. The method of claim 3, further comprising:
   displaying, in a virtual reality (VR) view of the device, the virtual model; and
   responsive to receiving an input at the device in the VR view, entering the AR session.

7. The method of claim 3, wherein the properties comprise one or more of color, material, a model number, a type, features particular to the first virtual object, or texture.

8. The method of claim 1, further comprising:
   generating, responsive to the user selection of the properties, a virtual model for the physical space, wherein the virtual model includes a virtual object generated according to the selected properties and including information to replace the first existing physical object with a different physical object.

9. The method of claim 8, further comprising, responsive to receiving an input via the AR session, ceasing the AR session and displaying the virtual model in a virtual reality (VR) view of the device, wherein, in the VR view, the virtual model occludes all objects in the physical space including the first existing physical object.

10. The method of claim 1, further comprising:
    receiving, at the device via the presented multi-dimensional model in the AR session, a request to change the properties to second properties, wherein the second properties includes at least one of a material or a color;
    updating the multi-dimensional model by configuring the multi-dimensional model to include the second properties; and
    causing the device to present, during the AR session, the updated multi-dimensional model in a subsequent overlay.

11. The method of claim 1, wherein the multi-dimensional model is associated with a virtual model, wherein the virtual model includes at least one virtual object that has the properties, and further comprising:
    receiving, at the device via the presented multi-dimensional model in the AR session, a request to change the properties to second properties; and
    updating the at least one virtual object in the virtual model by changing properties of the at least one object to the second properties.

12. The method of claim 1, wherein a second multi-dimensional model also corresponds to the first existing physical object, and further comprising:
    responsive to receiving, at the device, an input in the AR session, configuring the second multi-dimensional model to include at least one property different from the properties of the multi-dimensional model and to retain the second dimension.

13. The method of claim 12, further comprising, displaying the second multi-dimensional model in the AR session instead of the multi-dimensional model.

14. The method of claim 12, wherein the multi-dimensional model comprises a set of virtual objects in a first spatial arrangement and the second multi-dimensional model comprises the set of virtual objects in a second spatial arrangement different from the first spatial arrangement.

15. The method of claim 12, wherein the second multi-dimensional model comprises at least one virtual object that the multi-dimensional model does not comprise.

16. The method of claim 1, wherein determining the user selection of the properties comprises:
    displaying, in the AR session, a set of style templates, each style template of the set of style templates associated with a respective set of properties; and
    receiving, at the device in the AR session, a selection of a particular style template of the set of style templates, wherein the properties comprise a set of properties associated with the selected particular style template.

17. The method of claim 1, wherein the multi-dimensional model comprises a virtual object corresponding to the second physical object that is available to replace the first existing physical object.

18. The method of claim 17, wherein the multi-dimensional model comprises data associated with the second physical object and further comprising displaying, in the AR session, the data.

19. A non-transitory computer-readable storage medium comprising computer-readable instructions that, when executed by a processor, cause the processor to perform operations comprising:
    receiving image data generated by a camera of a device during an augmented reality (AR) session and showing at least a first existing physical object in a physical space, the first existing physical object having a first dimension along a first axis of a predefined coordinate system and a second dimension along a second axis of the predefined coordinate system;
    determining a multi-dimensional model corresponding to the first existing physical object that has a first model dimension along the first axis of the predefined coordinate system that is smaller than the first dimension and that has a second model dimension along the second axis of the predefined coordinate system, wherein the multi-dimensional model corresponds to a second physical object installable to replace the first existing physical object;
    determining a user selection of properties from a set of properties associated with the first existing physical object;
    configuring the multi-dimensional model to include the properties and retain the first model dimension; and
    causing the device to present, during the AR session and using the predefined coordinate system, the multi-dimensional model in an overlay such that the AR session shows (i) at least a portion of the first existing physical object based on the image data and (ii) the multi-dimensional model over a remaining portion of the first existing physical object and configured according to the properties and the first model dimension.

20. A system comprising:
a processor;
a non-transitory computer-readable storage medium comprising computer-readable instructions that, when executed by the processor, cause the system to perform operations comprising:
   receiving image data generated by a camera of a device during an augmented reality (AR) session and showing at least a first existing physical object in a physical space, the first existing physical object having a first dimension along a first axis of a predefined coordinate system and a second dimension along a second axis of the predefined coordinate system;
   determining a multi-dimensional model corresponding to the first existing physical object that has a first model dimension along the first axis of the predefined coordinate system that is smaller than the first dimension and that has a second model dimension along the second axis of the predefined coordinate system, wherein the multi-dimensional model corresponds to a second physical object installable to replace the first existing physical object;
   determining a user selection of properties from a set of properties associated with the first existing physical object;
   configuring the multi-dimensional model to include the properties and retain the first model dimension; and
   causing the device to present, during the AR session and using the predefined coordinate system, the multi-dimensional model in an overlay such that the AR session shows (i) at least a portion of the first existing physical object based on the image data and (ii) the multi-dimensional model over a remaining portion of the first existing physical object and configured according to the properties and the first model dimension.

* * * * *